US008495622B2

(12) United States Patent
Redpath

(10) Patent No.: US 8,495,622 B2
(45) Date of Patent: Jul. 23, 2013

(54) MICRO INSTALLATION PROCESS FOR SOFTWARE PACKAGING AND DISTRIBUTION

(75) Inventor: Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1656 days.

(21) Appl. No.: 11/936,649

(22) Filed: Nov. 7, 2007

(65) Prior Publication Data

US 2009/0119660 A1    May 7, 2009

(51) Int. Cl.
*G06F 9/44* (2006.01)
(52) U.S. Cl.
USPC .............................. 717/175; 717/177; 717/178
(58) Field of Classification Search
None
See application file for complete search history.

(56) References Cited

U.S. PATENT DOCUMENTS

| | | | | |
|---|---|---|---|---|
| 6,282,711 | B1 * | 8/2001 | Halpern et al. | 717/175 |
| 7,523,452 | B1 * | 4/2009 | Kamity et al. | 717/178 |
| 7,827,549 | B2 * | 11/2010 | Tarassov | 717/174 |
| 7,840,961 | B1 * | 11/2010 | Weathersby | 717/177 |
| 2003/0195949 | A1 * | 10/2003 | Slivka et al. | 709/219 |
| 2004/0015960 | A1 * | 1/2004 | Wanchoo et al. | 717/178 |
| 2004/0059703 | A1 * | 3/2004 | Chappell et al. | 707/1 |
| 2005/0022175 | A1 * | 1/2005 | Sliger et al. | 717/169 |
| 2005/0132359 | A1 * | 6/2005 | McGuire et al. | 717/175 |
| 2005/0289538 | A1 * | 12/2005 | Black-Ziegelbein et al. | 717/177 |
| 2006/0123414 | A1 * | 6/2006 | Fors et al. | 717/177 |
| 2006/0253631 | A1 * | 11/2006 | Dietrich et al. | 710/68 |
| 2008/0127169 | A1 * | 5/2008 | Malasky et al. | 717/174 |
| 2008/0127175 | A1 * | 5/2008 | Naranjo et al. | 717/174 |

OTHER PUBLICATIONS

Ziniry et al. A hands-on look at Java mobile agents. IEEE Internet Computing. Jul./Aug. 1997, pp. 21-30, Retrieved on [Mar. 7, 2013] Retrieved from the Internet: URL<http://ieeexplore.ieee.org/stamp/stamp.jsp?tp=&arnumber=612210>.*
Agarwalla et al. Automating Provisioning of Complete Software Stack in a Grid Environment, Georgia Institute of Technology,CC Technical Report; GIT-CC-04-06, 2004, Retrieved on [Mar. 7, 2013] Retrieved from the Internet: URL<https://smartech.gatech.edu/bitstream/handle/1853/6491/GIT-CC-04-06.pdf?sequence=1>.*

* cited by examiner

*Primary Examiner* — Thuy Dao
*Assistant Examiner* — Cheneca Smith
(74) *Attorney, Agent, or Firm* — Patent on Demand P.A.; Brian K. Buchheit; Scott M. Garrett

(57) ABSTRACT

The present invention discloses a software program that includes a first set of one or more compressed files and an executable file. The executable file can include a second set of one or more compressed files. The software program can be a self-executing program stored in a machine readable medium. Executing the software program can result in an automatic extraction of files contained within the first set and the second set of compressed files. In one embodiment, the software program can be an installation program, which includes a configuration file specifying settings to be applied during an installation process. The installation program can be dynamically constructed at a time an installation file is requested. The installation program can be a network lean file containing only those necessary components for a customized installation, which minimizes an amount of time and bandwidth expended when transferring the installation program over a network.

17 Claims, 4 Drawing Sheets

MICRO INSTALLATION PROCESS FOR SOFTWARE PACKAGING AND DISTRIBUTION

BACKGROUND

1. Field of the Invention

The present invention relates to the field of software distribution and, more particularly, to configurable and to a micro installation process for software packaging and distribution.

2. Description of the Related Art

There are many incarnations of self-extracting executable installer creation programs which allow software makers to create customized installable executables. However, these executables are statically created, lack flexibility, and require complicated scripts. Changes to the installer require the creators to reconstruct the installer, which can be a time consuming process. When multiple variants of the installer are necessary, it is not uncommon that a single monolithic installer, with all the software necessary for each configuration, is used. Installer generated installation files can be relatively large files that consume significant bandwidth when conveyed over a network and that consume significant computing resources when executed. Difficult to edit scripts are needed to manage the installation process. This results in installers with large file sizes that have excessive software components, which negatively affect performance and distribution.

When packaging software components for customized distribution and installation, it is often useful and necessary for users to make changes to suit special needs. For example, value added resellers may desire to brand an installation and to add additional components other than those that are part of a distributed product. In another example, a corporate information technology (IT) administrator may desire to make installation changes to tailor an installation to the company's needs, instead of being forced to make repetitive post-installation changes each time a product is installed. A lack of ability to tailor current installation routines has resulting in many IT departments creating software images of a model computer environment, then installing this image on similar computers. This practice saves time, but effectively circumvents a typical installation process of individual software packages. Negatives resulting from this circumvention include having improper licensing information for software on imaged machines, having imperfect matches between machine specific hardware and drivers, and reducing flexibility among various organization users by requiring use of a standard software configuration. Additionally, lack of ability to tailor current installation results in packaging everything and as a result produces a large network payload for distribution. For example, an eight megabytes software product could be distributed within as a seventy-five megabytes installation file.

Current installer programs generally result in a fixed deployable executable, which users, resellers, and distributors cannot easily modify in a desired manner. Additionally, many software producers utilize in-house tools and/or third party software to create installable software packages. To perform modifications, the users are forced to own the same installer tools, which is often infeasible and monetarily prohibitive. This is assuming that the users wanting to modify the installable software packages even have access to package source artifacts that modifications can be made against. Additionally, many of the installer tools are platform specific, which results in problems deploying software across multiple platforms. It would be advantageous if a flexible and adaptable solution for a self-extracting executable installer were devised.

SUMMARY OF THE INVENTION

The present invention discloses a solution for creating and using configurable and extensible self-extracting executables for software distribution based on compressed archives. In the solution, a software program can include a self-extracting executable capable of concatenating to the executable one or more compressed archives containing software components. Creation of the executable can include the use of system commands such as copy, cat, and the like. The resultant executable can be directed by a configuration file included in the executable. Additional compressed archives can be concatenated throughout the life cycle of the executable and the configuration file can be similarly modified throughout the life cycle. Execution of the program can result in parsing the configuration file, if present, and uncompressing of all constituent compressed archives. Upon decompression, the executable can execute a command or program, such as an installation kickoff program.

Unlike traditional installation programs, those produced by the solution are network lean and configurable. Network lean can be important in situations where a program or set of programs are to be deployed on a large number of machines, such as on ten thousand machines belonging to a corporate network. The installation programs resulting from the disclosed solution can include minimal installer overhead. The solution's installation programs also are high performance ones, since extraneous installer specific processes are minimized and processing resources are not consumed by an installer. Improved installation performance can be especially important when deploying software on resource limited devices, such as mobile telephones, gaming platforms, and media players. Additionally, the programs necessary for creating deployable solutions or for modifying the same are very light-weight. The light weight installer can perform necessary functions from either a command line or a GUI interface. The installer can easily be deployed in a standardized manner across multiple platforms.

The present invention can be implemented in accordance with numerous aspects consistent with the materials presented herein. One aspect of the present invention can include a software installation method that includes a step of creating a first installation archives. The first installation archive can include at least one compressed file having an engrained directory structure for at least a first part of an installable software program. After the creation of the first installation archive, a second installation archive can be created by adding at least one additional compressed file to the first installation archives. The additional compressed file can also include an engrained directory structure for at least a second part of said installable software program. The first installation archive and the second installation archive can both be self-executing files. The second installation archive can encapsulate the first installation archive and the at least one additional compressed file. The second installation archive can execute upon a target computing device. Executing the second installation archive can result in decompressing the compressed files contained in the first and second archives, which results in files being added to a storage space accessible by the target computing device, where the added files conform to the engrained directory structures defined by the first and second archives. After the second installation archive is executed, the installable software program including a first part and the second part has been installed on the target computing device.

Another aspect of the present invention can include a method for packaging and distributing software. The method can include a step of receiving a user request specifying a desired core software installation file and a user selected set of optional configuration packages. A micro install process archive can be dynamically created that includes a first self executing file and zero or more additional self executing files. Each of the additional self executing files can represent a user selected optional configuration package for a software installation. Each of the self executing files can include a set of compressed files having an engrained directory structure. The micro install process archive can be conveyed to a requester. When the micro install process archive is executed upon a target computing device, all compressed files contained in the self executing files can be extracted to a storage space of the target computing device. The engrained directory structure can be preserved after extraction.

Still another aspect of the present invention can include a software program that includes a first set of one or more compressed files and an executable file. The executable file can include a second set of one or more compressed files. The software program can be a self-executing program stored in a machine readable medium. Executing the software program can result in an automatic extraction of files contained within the first set and the second set of compressed files. In one embodiment, the software program can be an installation program, which includes a configuration file specifying settings to be applied during an installation process.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
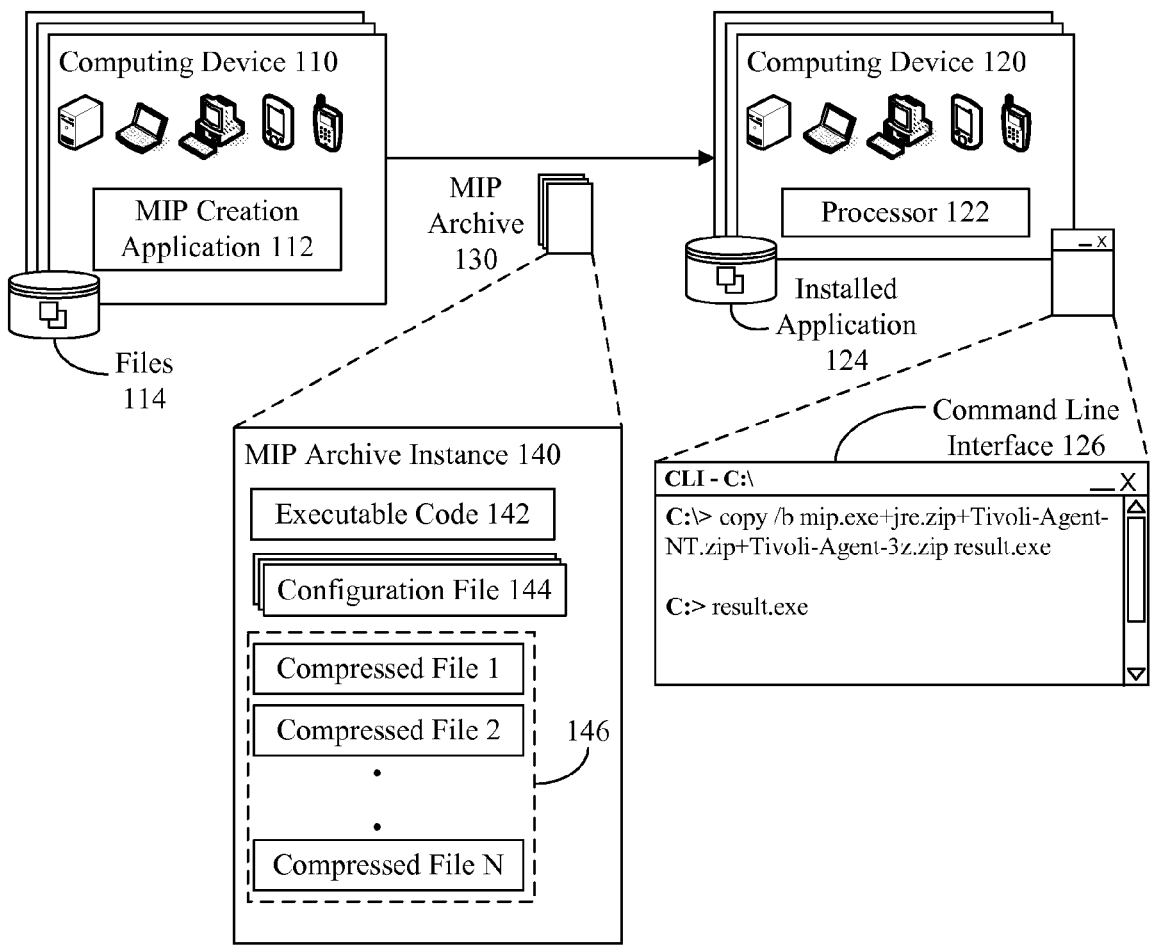
FIG. 1 is a schematic diagram illustrating a system for a high performance, network lean and configurable software installation solution in accordance with an embodiment of the inventive arrangements disclosed herein.

FIG. 1 is a schematic diagram illustrating a system 100 for a high performance, network lean and configurable software installation solution in accordance with an embodiment of the inventive arrangements disclosed herein. System 100 creates, deploys, and executes a Micro Install Process (MIP) archive 130. The MIP archive 130 can be a self-executing compressed file having an ability to rapidly decompress itself. The MIP 130 can include executable code 142, a configuration file 144, and a number of compressed archive files 146. A MIP archive instance 130 can be modified to add new compressed archives 146 and/or to alter the configuration file 144.

Additionally, a MIP archive 130 can be nested within other MIP archives 130. When a parent archive 130 is executed, all child archives 130 also execute, which results in all included compressed files 146 being extracted regardless of what level of nesting they are contained within. The nesting ability permits a series of MIP archives 130 to be constructed that include a core software installation component (in one archive 130) and a set of optional components (in other archives 130) for a specific installation instance or client. MIP archives 130 can be dynamically or statically created.

As shown, a computing device 110 can utilize a MIP creation application 112 to create a MIP archive 130 that includes one or more files 114 that are packaged in a compressed form for deployment and installation upon one or more computing devices 120. Files 114 can include compressed archives 146, configuration files 144, and the like. Once received by computing device 120, optional modification of MIP archive 130 can occur. For example, a command line interface 126 can be used to add additional compressed files to the archive 146. Executing the resultant self-extracting executable can invoke an installation process on processor 122 resulting in installed application 124.

Configuration file 144 can affect the execution of MIP archive instance 140, such as dictating process priority, resource usage, program/command execution, and the like. On computing devices with limited resources, configuration file 144 can be used to direct the execution process within the device tolerances. Configuration file 144 can control program execution based on the degree of success or failure of the executable code 142. For example, configuration file 144 can indicate a clean up process that can be invoked when failure to uncompress a component occurs. In the event of a successful extraction of components, a configuration file 144 entry can indicate the appropriate program/command to execute. In one embodiment, configuration file 144 can be a text file appended to the end of a MIP archive instance. Configuration file 144 can include a text file, XML file, YAML file, binary file, and the like.

Compressed archives 146 can maintain the original directory structure after concatenation into the MIP archive instance 140. MIP archive instance 140 can store compressed archives 146 without requiring additional data structures. As a result, compressed archives 146 can be easily concatenated without modification to the MIP archive instance 140 via a copy system command. Compressed archives 146 can be a file generated with any of a variety of different compression technologies. For example, the compressed archive 146 can be in a PKZIP, 7ZIP, RAR, GZIP, BZIP, or other compression format. In one embodiment, compressed archives 146 can be homogenous in nature containing only one type of compressed archives. In another embodiment, compressed archives 146 can be a one of multiple compressed formats. Further, compressed files can be stand-alone files able to be uncompressed by themselves or can be one of a set of component archived files, which must be joined to create a master compressed file, which can be decompressed. (i.e., component files—file.001, file.002, file.003, etc. can be joined to create file.archive, which is a master compressed file.) Even after archive 130 has been initially created and conveyed, additional files and/or configuration details can be added, which is shown by command line interface 126.

Figure 2:
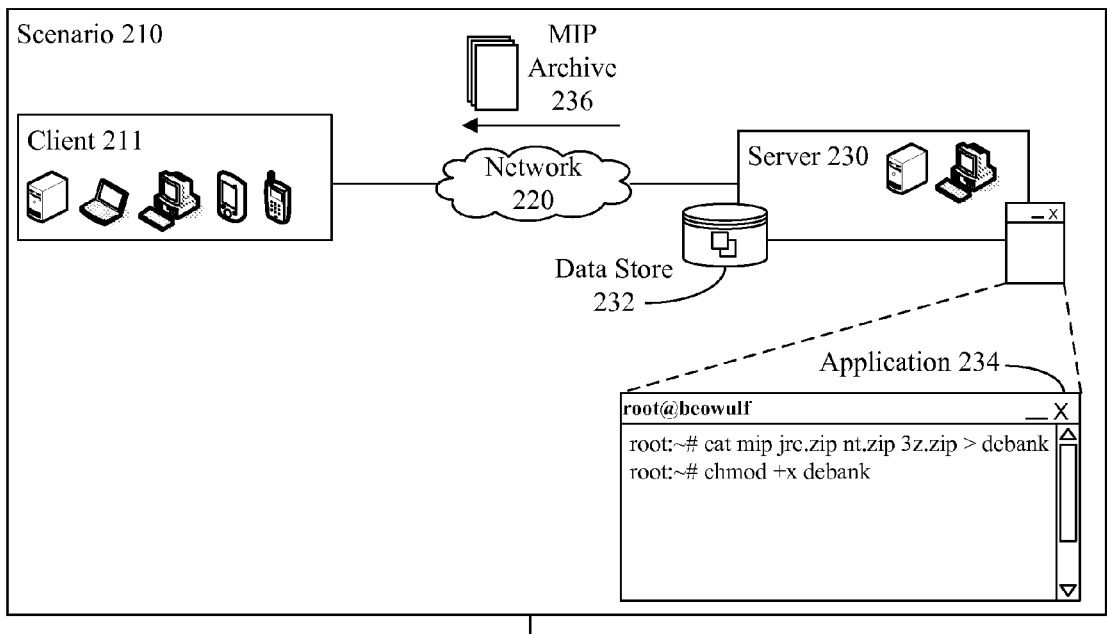
FIG. 2 is a schematic diagram illustrating a set of scenarios in which image archive instances, such as MIP archive instances, are created and deployed in accordance with an embodiment of inventive arrangements disclosed herein.
Figure 2:
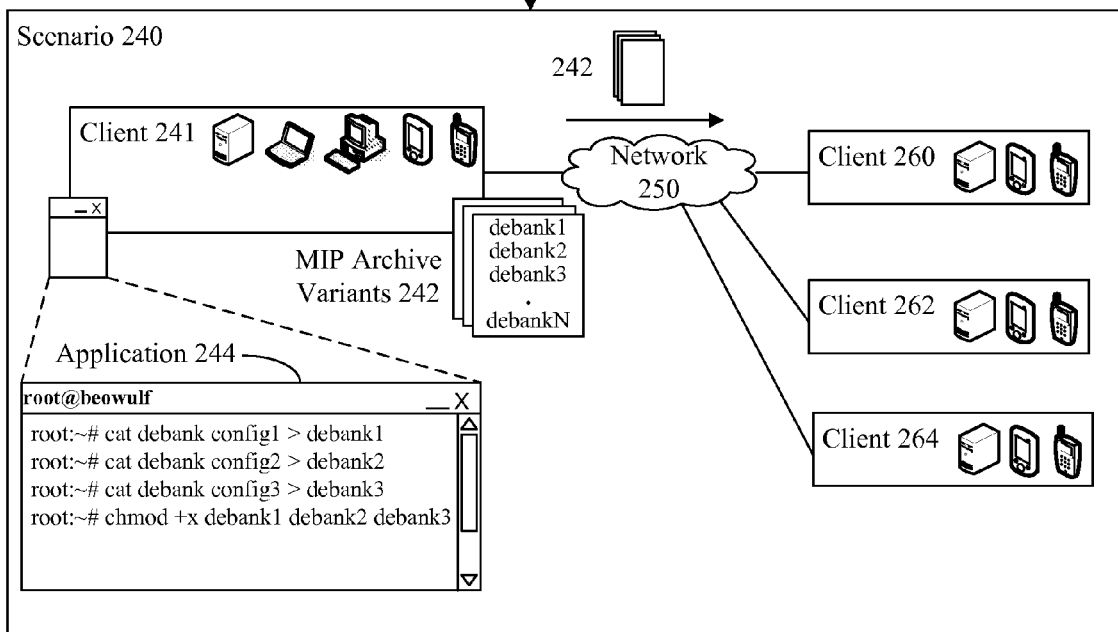

FIG. 2 is a schematic diagram illustrating a set of scenarios 210, 240 in which image archive instances, such as MIP archive instances, are created and deployed in accordance with an embodiment of inventive arrangements disclosed herein. Scenarios 210, 240 can be performed in the context of system 100. In each scenario 210, 240, a MIP archive 236, 242 can facilitate remote software distribution and installation. It should be appreciated that modifications can occur to the MIP archive 236 between it's creation by server 230 and it's installation at client 211.

In scenario 210, a server 230 can distribute MIP archive 236 to client 211 via network 220. The MIP archive 236 can be of arbitrary complexity. For purposes of scenario 210, MIP archive 236 can contain TIVOLI software components, which are to be installed in client 211. The MIP archive 236 can contain software agents and libraries. Server 230 can create MIP archive 236 using application 234. In one embodiment, application 234 can be a command line interface (used in the example), a graphic user interface, a voice interface, or any other interface type.

A system command, such as cat, can be entered in the command line interface to create the MIP archive 236 from compressed files stored in data store 232. The created MIP archive 236 can be a self-extracting executable. A simplicity with which the MIP archive 236 is able to be created can encourage a creation of customized packages containing a minimal amount of unnecessary overhead, which are ideally suited for resource efficient network deployments. For example, the MIP archive instance 236 can include JAVA runtime environment components and two TIVOLI agents in a self-extracting executable. It is possible to dynamically create a MIP archive 236 at runtime, which can be customized for a specific client 211 need. This need can be determined from manual user specifications and/or by automatically querying a present configuration of client 211. For example, client 211 can convey platform and installed package information specific to itself to server 230, which determines which components of a solution are needed for the client. Application 234 can then dynamically package these components in archive 236. Once created, MIP archive 236 can be conveyed to client 211 for usage or further modification as shown in scenario 240.

In scenario 240, client 241 can modify MIP archive 236 to produce multiple variants 242 of the MIP archive 236 for usage on clients 260-264. Modification of MIP archive 236 can be achieved using application 244 as shown. As shown in application 244, different versions of a software installation package (e.g., debank) can be created by specifying unique configuration files (config 1-3) and destinations (debank 1-3). Once multiple MIP archive variants 242 have been created, the variants 242 can be deployed over network 250 and can be distributed to clients 260-264. Each variant 242 received by each client 260-264 can be specifically tailored to that client 260-264 or can be tailored for a group of clients representing a particular client platform or configuration.

For example, client 260 can be a mobile computing device containing unique directory structures. Debank1 can be configured to install TIVOLI software specific to the directory structure of the mobile computing device. In another instance, client 262 can be a desktop computer that requires additional library components for software installation, which can be included into a received archive prior to distribution. Client 264 can be desktop computer having a different operating system than client 262.

In one embodiment, the client 241 that creates the MIP archive variants 242 can be considered an installation server, which can be clustered (e.g., implemented as server 1, server 2, server 3, . . . server n) as desired. For example, client 260 can be part of a set of clients that communicate with server 1; client 262 can be part of a set of clients configured to communicate with server 2; client 264 can be part of a set of clients configured to communicate with server 3; and so forth. Distributing a number of clients 260-264 across a set of servers can improve scalability concerns in situations involving a large number (e.g., four hundred) of clients 260-264.

As shown herein, data store 232 can be physically implemented within any type of hardware including, but not limited to, a magnetic disk, an optical disk, a semiconductor memory, a digitally encoded plastic memory, a holographic memory, or any other recording medium. The data store 232 can be stand-alone storage units as well as a storage unit formed from a plurality of physical devices, which may be remotely located from one another. Additionally, information can be stored within the data store 232 in a variety of manners. For example, information can be stored within a database structure or can be stored within one or more files of a file storage system, where each file may or may not be indexed for information searching purposes.

Networks 220, 250 can include any hardware/software/and firmware necessary to convey digital content encoded within carrier waves. Content can be contained within analog or digital signals and conveyed through data or voice channels and can be conveyed over a personal area network (PAN) or a wide area network (WAN). The networks 220, 250 can include local components and data pathways necessary for communications to be exchanged among computing device components and between integrated device components and peripheral devices. The networks 220, 250 can also include network equipment, such as routers, data lines, hubs, and intermediary servers which together form a packet-based network, such as the Internet or an intranet. The networks 220, 250 can further include circuit-based communication components and mobile communication components, such as telephony switches, modems, cellular communication towers, and the like. The networks 220, 250 can include line based and/or wireless communication pathways.

Figure 3:
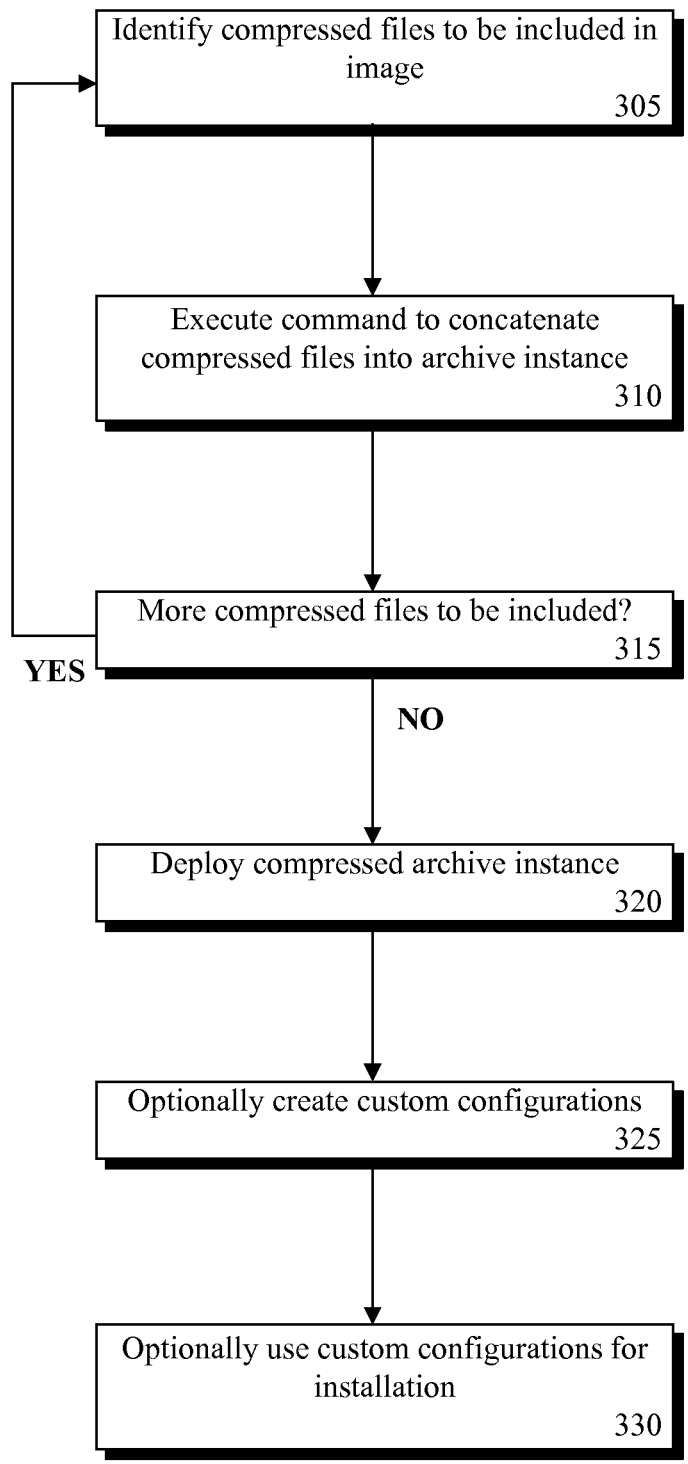
FIG. 3 is a flowchart diagram illustrating a method for the creation of an image archive, such as a MIP archive, in accordance with an embodiment of the inventive arrangements disclosed herein.

FIG. 3 is a flowchart diagram illustrating a method 300 for the creation of an image archive, such as a MIP archive, in accordance with an embodiment of the inventive arrangements disclosed herein. The method 300 can be performed in the context of system 100 or any similar system. The created archive can be used for deploying and installing software. Contents of the archive can include compressed files, configuration files, and the like.

The method can begin in step 305 where a set of files is identified to be included in an archive instance. In step 310, a command can be executed to concatenate a set of compressed files into the archive instance. If files are initially uncompressed, an optional additional step of compressing the files can occur after step 305 and before step 310. In step 315, if there are more compressed files to be included, the method can return to step 305, else continue to step 320. In step 320, the archive instance can be deployed and distributed. In step 325, an optional customized configuration of the archive instance can occur. Custom configuration can include concatenation of additional compressed files, addition of configuration files, and the like. Customization of the archive instance can occur after it is initially deployed by a user, distributor, or other entity. In step 330, the archive instance can be used during an installation process.

Figure 4:
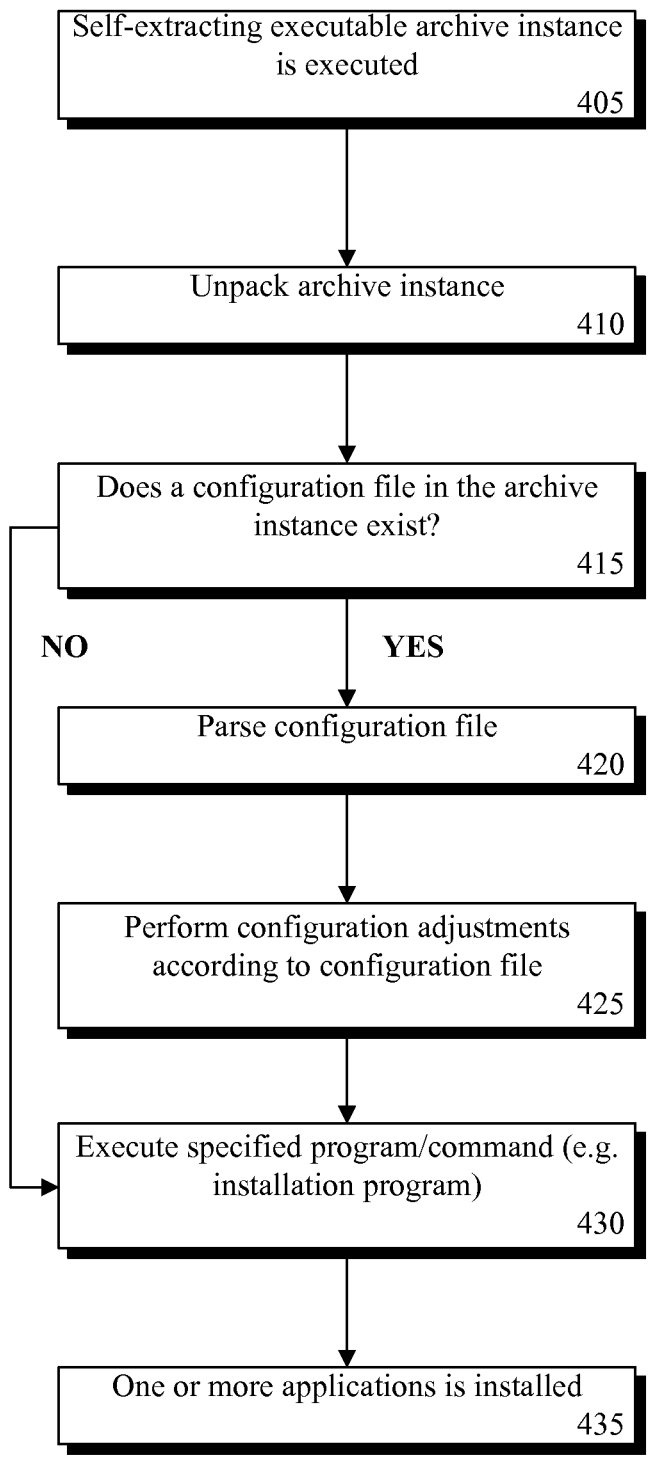
FIG. 4 is a flowchart diagram illustrating a method for utilizing an image archive, such as a MIP archive, in accordance with an embodiment of inventive arrangements disclosed herein.

FIG. 4 is a flowchart diagram illustrating a method 400 for utilizing an image archive, such as a MIP archive, in accordance with an embodiment of inventive arrangements disclosed herein. The method 400 can be performed in the context of system 100 or any similar system. The image archive of method 400 can be created and deployed using method 300.

The method 400 can begin in step 405 where a self-extracting executable archive instance is executed. In step 410, the archive instance can execute and can unpack each compressed file contained in the archive instance. For instance, the archive can be opened and read to determine which, if any, compressed files are included in the archive instance. In one embodiment, one or more magic numbers can be included in the archive instance. Magic numbers implement strongly typed data and are a form of in-band signaling to the controlling program that reads the data type(s) at program run-time. Detecting such constants in files is a simple, effective, and flexible way of distinguishing between many file formats. The unpacking process of step 410 can handle any included file having a magic number for a format, which adds to the solution's flexibility. Each compressed file included in the archive can have a known size as defined by an associated compressed file format. Unpacking of the archive can iteratively occur until no unprocessed files and no magic numbers are found. Additionally, during unpacking, an optional configuration file, which can be a flat text file, can be identified and can be extracted from the archives. It should be understood that other forms of metadata besides magic numbers can also be used, and that the invention is not to be construed as limited in this regard.

After the archive instance is unpacked, the method can proceed to step 415. In step 415, if a configuration file exists in the archive instance, the method can proceed to step 420, else jump to step 430. In step 420 the configuration file, which can be a text file or other file from which content is able to be extracted, can be opened and parsed. In step 425, the executable can executes a specified program/command in a fashion specified by the configuration file. In step 435, one or more applications can be installed as a result of the executed program/command. After applications are installed, temporary files generated during the installation can be optionally deleted, as can the image archive file itself.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A software installation method comprising:
creating a first installation archive comprising at least one compressed file, wherein said at least one compressed file has an engrained directory structure for at least a first part of an installable software program;
after the creation of the first installation archive, creating a second installation archive by adding at least one additional compressed file to the first installation archive, wherein said at least one additional compressed file has an engrained directory structure for at least a second part of said installable software program, wherein said first installation archive and said second installation archive are both self-executing files;
executing said second installation archive upon a target computing device, wherein said executing step comprises:
decompressing said at least one additional compressed file in a storage space accessible by said target computing device, wherein said decompressing results in an expansion of said at least a second part said expansion having said engrained directory structure; and
decompressing said at least one compressed file in a storage space accessible by said target computing device, wherein said decompressing results in an expansion of said at least a first part of said expansion having said engrained directory structure, wherein after said executing step, said installable software program comprising said at least a first part and said at least a second part has been installed on said target computing device.

2. The method of claim 1, wherein said second installation archive encapsulates the first installation archive and the at least one additional compressed file.

3. The method of claim 2, wherein the first installation archive is unmodified when encapsulated within said second installation archive.

4. The method of claim 3, wherein said second installation archive comprises a configuration file, said executing step further comprising:
reading installation details from said configuration file; and
performing said decompressing steps in accordance with said installation details.

5. The method of claim 1, wherein said at least a second part comprises an optional component of said installable software program not needed by every target computing device, said method further comprising:
executing said first installation archive upon a second target computing device, wherein said executing step comprises:
decompressing said at least one compressed file in a storage space accessible by said second target computing device, wherein said decompressing results in an expansion of said at least a first part, said expansion having said engrained directory structure of said at least a first part, wherein after said executing step, said installable software program comprising said at least a first part has been installed on said second target computing device.

6. The method of claim 5, wherein said at least a second part comprises an optional component of said installable software program needed for a first computing platform, wherein said target computing device conforms to standards of said first computing platform, said method further comprising:

creating a third installation archive by adding at least one different compressed file to the first installation archive, wherein said at least one different compressed file includes an engrained directory structure for at least a different part of said installable software program, wherein said third installation archive is a self-executing file that encapsulates the first installation archive and the at least one different compressed file, wherein the first installation archive is unmodified when encapsulated within said third installation archive;

executing said third installation archive upon a different target computing device, said executing step comprising:

decompressing said at least one different compressed file in a storage space accessible by said different target computing device, wherein said decompressing results in an expansion of said at least a different part, said expansion having said engrained directory structure of said at least a different part; and decompressing said at least one compressed file in a storage space accessible by said target computing device, wherein said decompressing results in an expansion of said at least a first part of said expansion having said engrained directory structure of said at least a first part, wherein after the step of executing said third installation archive, said installable software program comprising said at least a first part and said at least a different part has been installed on said different target computing device.

7. The method of claim 1, wherein said step of creating the first installation archive results from processing a first operating system command, and wherein said step of creating the second installation archive results from processing a second operating system command.

8. The method of claim 7, wherein the first operating system command and the second operating system command are standard operating system commands, each receiving at least one parameter specific to creating a related archive file.

9. The method of claim 8, wherein said first operating system command and the second operating system command are entered by a user via a command line interface.

10. The method of claim 1, wherein said steps of claim 1 are performed by at least one machine in accordance with at least one computer program stored in a non-transitory computer readable media, said computer programming having a plurality of code sections that are executable by the at least one machine.

11. A method for packaging and distributing software comprising:

receiving a user request specifying a desired core software installation file and a user selected set of optional configuration packages for a software installation;

dynamically creating a micro install process archive comprising a first self executing file representing the core software installation file and comprising a plurality of additionally self executing files, one for each of the user selected optional configuration packages, wherein each of the self-executing files comprise a set of compressed files having an engrained directory structure, wherein the first self executing file and each of the additional self executing files are micro install process archive files, and wherein the dynamically creating step utilizes a standard operating system command that includes a plurality of parameters specific to creating the micro install process archive, wherein the plurality of parameters comprise a parameter for the first self extracting executable and an additional parameter for each of the additional self extracting executables; and conveying the micro install process archive to a requestor, wherein when the micro install process archive is executed upon a target computing device, all compressed files contained in the self executing files are extracted to a storage space of the target computing device while the engrained directory structure is preserved after extraction.

12. The method of claim 11, wherein the micro install process archive is referable to as an original micro install process archive, said method further comprising:

the requestor creating a new micro install process archive comprising said a set of compressed files and said original micro install process archive, wherein when the new micro install process archive is executed upon a target computing device, all compressed files contained in the self executing files including the set of compressed files of the new micro install process archive and those contained in the original micro install process archive are extracted to a storage space of the target computing device.

13. A computer program product comprising:

one or more computer-readable, non-transitory media;

program instructions, stored on at least one of the one or more storage mediums, to create a first installation archive comprising at least one compressed file, wherein said at least one compressed file has an engrained directory structure for at least a first part of an installable software program;

program instructions, stored on at least one of the one or more storage mediums, to, after the creation of the first installation archive, create a second installation archive by adding at least one additional compressed file to the first installation archive, wherein said at least one additional compressed file has an engrained directory structure for at least a second part of said installable software program, wherein said first installation archive and said second installation archive are both self-executing files;

program instructions, stored on at least one of the one or more storage mediums, to execute said second installation archive upon a target computing device, wherein said executing step comprises:

decompressing said at least one additional compressed file in a storage space accessible by said target computing device, wherein said decompressing results in an expansion of said at least a second part said expansion having said engrained directory structure; and decompressing said at least one compressed file in a storage space accessible by said target computing device, wherein said decompressing results in an expansion of said at least a first part of said expansion having said engrained directory structure, wherein after said executing step, said installable software program comprising said at least a first part and said at least a second part has been installed on said target computing device.

14. The computer program product of claim 13, wherein said second installation archive encapsulates the first installation archive and the at least one additional compressed file.

15. The computer program product of claim 14, wherein the first installation archive is unmodified when encapsulated within said second installation archive.

16. The computer program product of claim 15, wherein said second installation archive comprises a configuration file, said executing step further comprising:

reading installation details from said configuration file; and
performing said decompressing steps in accordance with said installation details.

17. The computer program product of claim 13, wherein said at least a second part comprises an optional component of said installable software program not needed by every target computing device, said computer program product further comprising:
program instructions, stored on at least one of the one or more storage mediums, to execute said first installation archive upon a second target computing device, wherein said executing step comprises:
decompressing said at least one compressed file in a storage space accessible by said second target computing device, wherein said decompressing results in an expansion of said at least a first part, said expansion having said engrained directory structure of said at least a first part, wherein after said executing step, said installable software program comprising said at least a first part has been installed on said second target computing device.

\* \* \* \* \*